United States Patent
Ito

(10) Patent No.: US 9,009,555 B2
(45) Date of Patent: Apr. 14, 2015

(54) COMMUNICATION METHOD, COMMUNICATION SYSTEM, COMMUNICATION TERMINAL APPARATUS AND COMMUNICATION BASE STATION APPARATUS

(75) Inventor: Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 616 days.

(21) Appl. No.: 13/235,558

(22) Filed: Sep. 19, 2011

(65) Prior Publication Data

US 2012/0005550 A1 Jan. 5, 2012

Related U.S. Application Data

(63) Continuation of application No. PCT/JP2009/001507, filed on Mar. 31, 2009.

(51) Int. Cl.
*H03M 13/00* (2006.01)
*H04L 1/18* (2006.01)
*H04L 1/00* (2006.01)

(52) U.S. Cl.
CPC ............ *H04L 1/1893* (2013.01); *H04L 1/0003* (2013.01); *H04L 1/0009* (2013.01); *H04L 1/0029* (2013.01); *H04L 1/0032* (2013.01); *H04L 1/1822* (2013.01); *H04L 1/1896* (2013.01); *H04L 1/0046* (2013.01)

(58) Field of Classification Search
None
See application file for complete search history.

(56) References Cited

U.S. PATENT DOCUMENTS

| | | | |
|---|---|---|---|
| 8,321,741 B2 * | 11/2012 | Wei et al. ................... | 714/749 |
| 8,661,307 B2 * | 2/2014 | Jitsukawa et al. ............ | 714/748 |
| 2005/0195858 A1 | 9/2005 | Nishibayashi et al. | |
| 2006/0203924 A1 | 9/2006 | Casaccia et al. | |
| 2006/0234628 A1 | 10/2006 | Horiguchi et al. | |
| 2008/0096571 A1 | 4/2008 | Pedersen et al. | |
| 2008/0225782 A1 | 9/2008 | Wang et al. | |
| 2008/0310385 A1 | 12/2008 | Iochi et al. | |
| 2009/0138774 A1* | 5/2009 | Singh et al. .................. | 714/748 |
| 2010/0014474 A1 | 1/2010 | Miki et al. | |
| 2013/0294251 A1* | 11/2013 | Hoshino et al. ............... | 370/236 |

FOREIGN PATENT DOCUMENTS

| | | |
|---|---|---|
| EP | 1 737 263 | 12/2006 |
| EP | 1 826 939 A1 | 8/2007 |

(Continued)

OTHER PUBLICATIONS

Fujitsu; "Grouped and Encoded Packet based HARQ for LTE-Advanced"; 3GPP TSG-RAN1 #56b; R1-091497, pp. 1-9; dated Mar. 27, 2009.

(Continued)

*Primary Examiner* — Justin R Knapp
(74) *Attorney, Agent, or Firm* — Myers Wolin, LLC

(57) ABSTRACT

When transmitting retransmission data, MCS information of a control channel for when communicating the new data is replaced with retransmission control information and the control channel is transmitted. When receiving retransmission data, the control channel is received to obtain the retransmission control information, the replaced MCS information is estimated from the control channel received at the time of communication of new data, and a reception process of retransmission data is controlled using the estimated MCS information and the retransmission control information.

10 Claims, 19 Drawing Sheets

(56) References Cited

FOREIGN PATENT DOCUMENTS

| | | |
|---|---|---|
| EP | 2 068 483 | 6/2009 |
| JP | 05-103017 | 4/1993 |
| JP | 5-160817 | 6/1993 |
| JP | 2005-109909 | 4/2005 |
| JP | 2005-252897 | 9/2005 |
| JP | 2006-148981 | 6/2006 |
| JP | 2006-203355 | 8/2006 |
| JP | 2008-92378 | 4/2008 |
| JP | 2008-515358 | 5/2008 |
| WO | 2006/039635 | 4/2006 |
| WO | 2008/145152 A1 | 12/2008 |

OTHER PUBLICATIONS

International Search Report issued for corresponding International Patent Application No. PCT/JP2009/001507, mailed Jun. 30, 2009.

Panasonic; "Joint Transport Format and Redundancy Version signaling with explicit NDI"; Agenda Item: 6.1.3; 3GPP TSG-RAN WG1 Meeting #51bis; Jan. 14-18, 2008; R1-080591; Sevilla, Spain.

Notice of Rejection Grounds issued for corresponding Japanese Patent Application No. 2011-506846, mailed Jan. 22, 2013 with English translation.

Extended European search report, the supplementary European search report and the European search opinion issued for corresponding European Patent Application No. 09842571.3, dated Jun. 6, 2014.

Panasonic et al., "RAN1/2 specification alignment on HARQ operation", Agenda Item: 6.3, Sep. 29-Oct. 3, 2008, R1-083667, pp. 1-4, 3GPP TSG-RAN WG1 Meeting #54bis, 3rd Generation Partnership Project (3GPP), Prague, Czech Republic.

3rd Generation Partnership Project; Technical Specification Group Radio Access Network; Evolved Universal Terrestrial Radio Access (E-UTRA); "Physical layer procedures (Release 8)", Mar. 2009, pp. 1-80, vol. 8.6.0, 3GPP TS 36.213, 3rd Generation Partnership Project (3GPP).

* cited by examiner

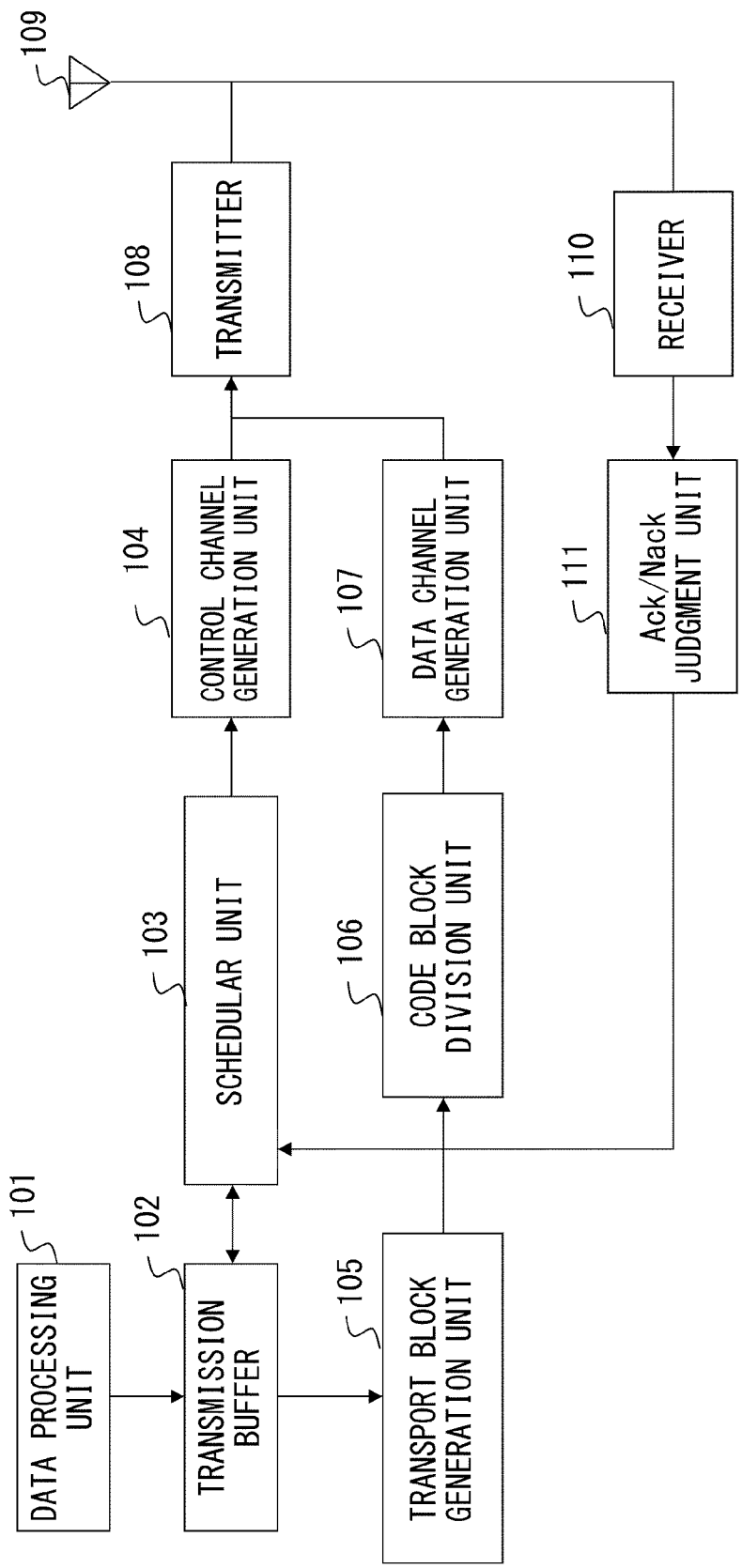
F I G. 1

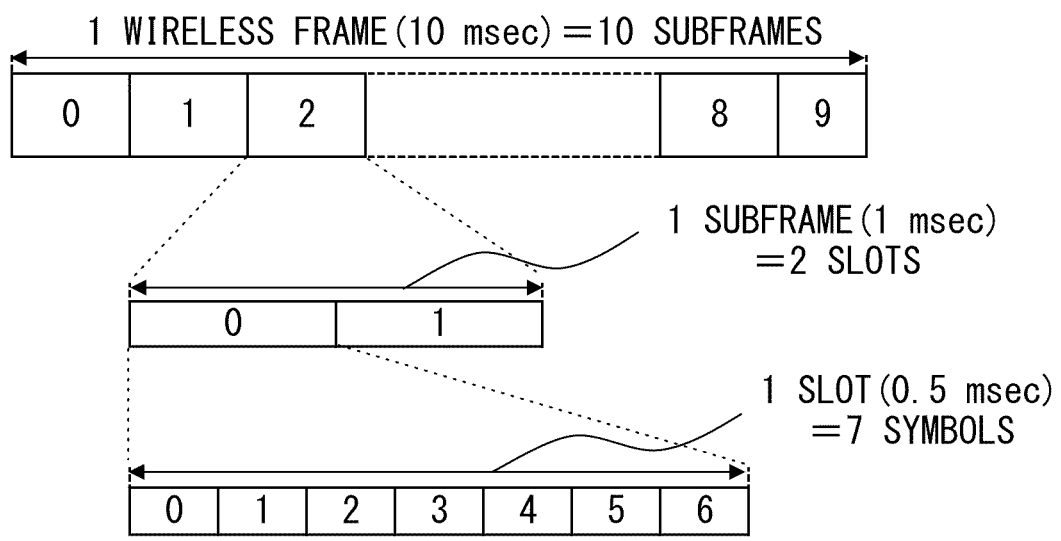
F I G. 4

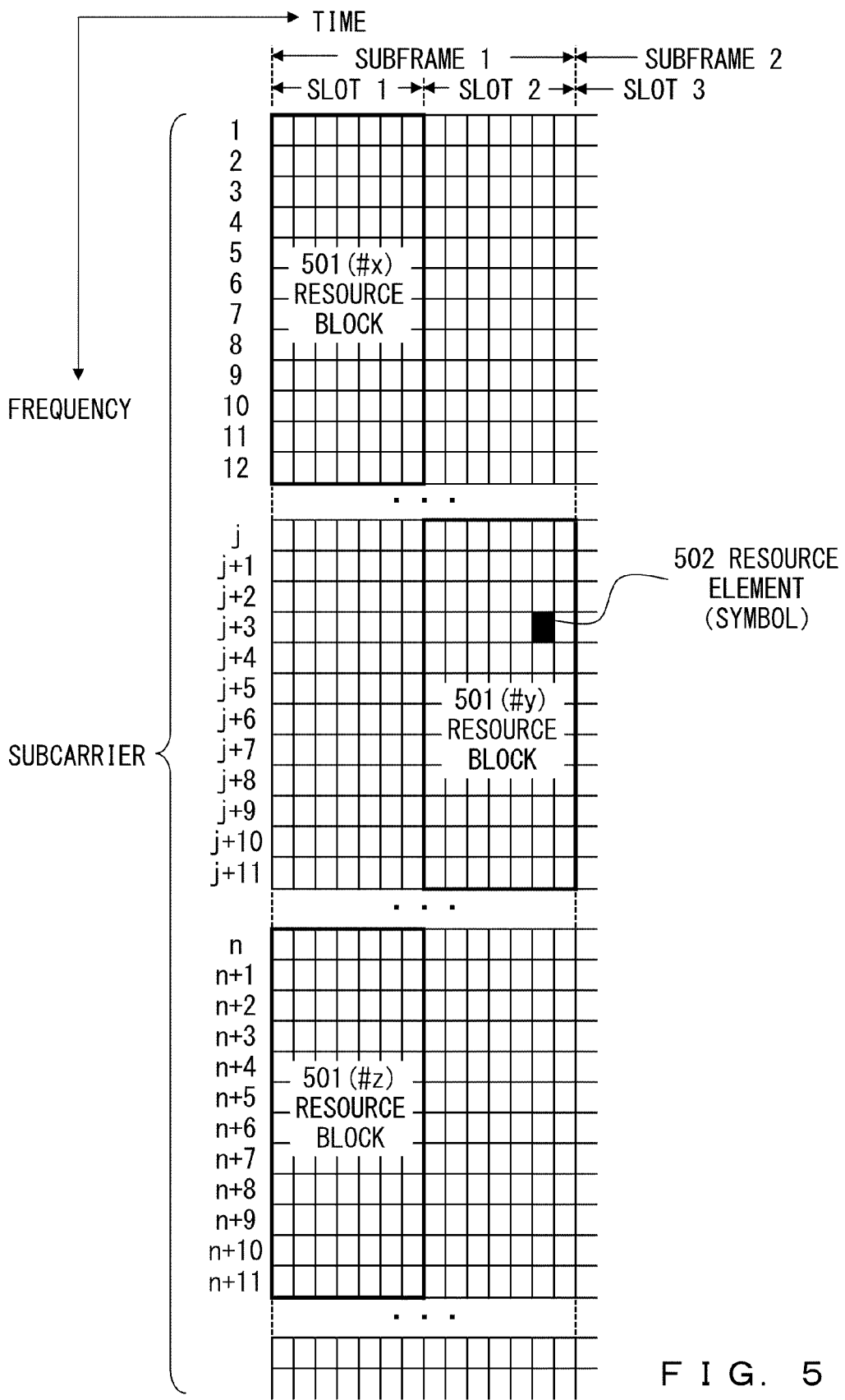
F I G. 5

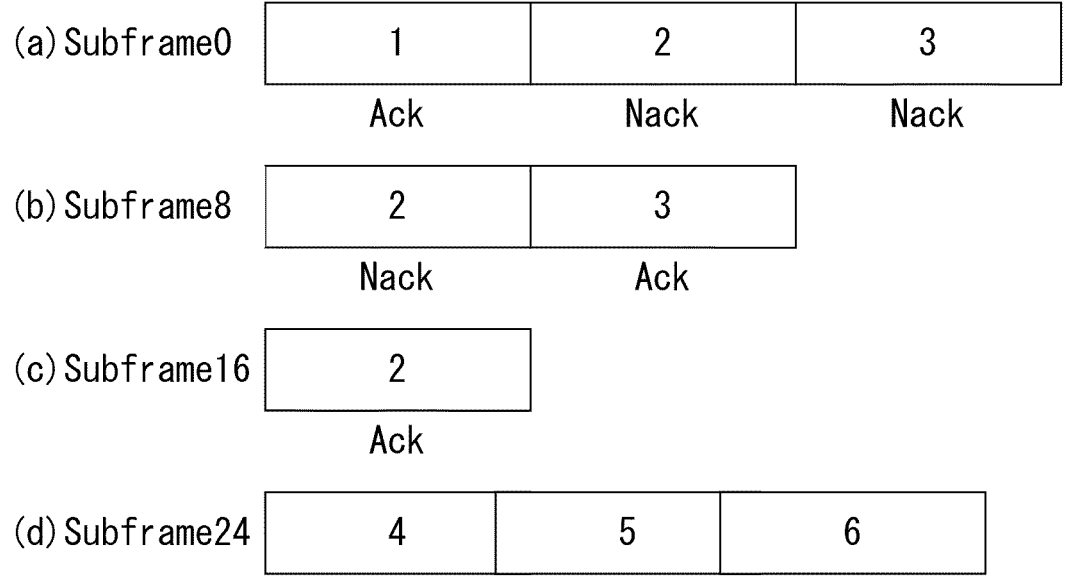
F I G. 6

(a) NEW TRANSMISSION

| RB ASSIGNMENT | MCS | OTHERS |

(b) RETRANSMISSION

| RB ASSIGNMENT | MCS | OTHERS | RETRANSMISSION BLOCK |

(a) NEW TRANSMISSION: | RB ASSIGNMENT | MCS | OTHERS |

(b) RETRANSMISSION: | RB ASSIGNMENT | RETRANSMISSION BLOCK | OTHERS |

(a) Subframe0

| 1-1 | 1-2 | 1-3 |
|---|---|---|
| Ack | Nack | Nack |

(b) Subframe8

| 1-2 | 1-3 | 2-1 |
|---|---|---|
| Nack | Ack | Nack |

(c) Subframe16

| 1-2 | 2-1 | 2-2 |
|---|---|---|
| Ack | Ack | Ack |

(d) Subframe24

| 2-3 | 3-1 | 3-2 |
|---|---|---|

F I G. 1 1

| RB | MCS | PID | OTHERS | RB | MCS | PID | OTHERS |

RB: RB ASSIGNMENT
MCS: Modulation and coding scheme
PID: PROCESS ID

F I G. 1 3

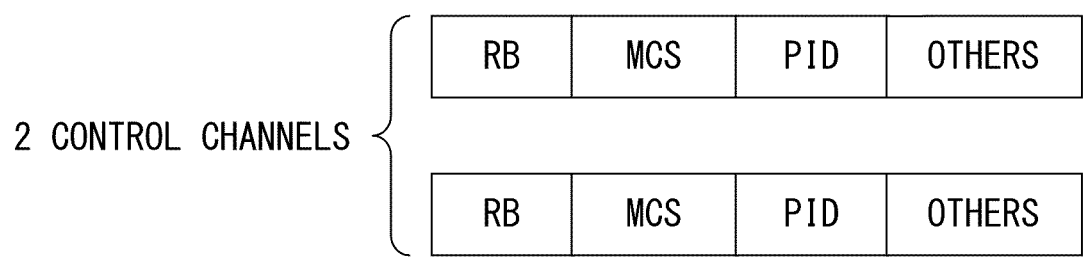
F I G. 1 4

(a) PHYSICAL RESOURCE 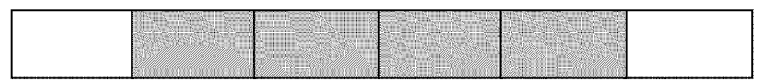
(b) SEARCH SPACE
(6 TYPES) 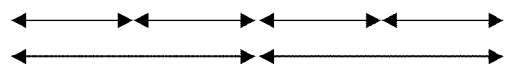
FIG. 15

(a) WHEN NUMBER OF HARQ=1

| RB | N | MCS | PID | OTHERS | Padding |

1801  1802

(b) WHEN NUMBER OF HARQ=2

| RB | N | MCS | PID | OTHERS | MCS | PID | OTHERS |

RB: RB ASSIGNMENT
N: RB NUMBER
MCS: Modulation and coding scheme
PID: PROCESS ID

FIG. 18

(a) WHEN NUMBER OF HARQ=1 
(b) WHEN NUMBER OF HARQ=2 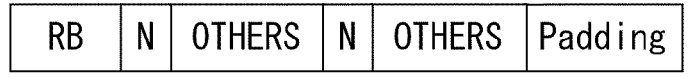
(c) WHEN NUMBER OF HARQ=3 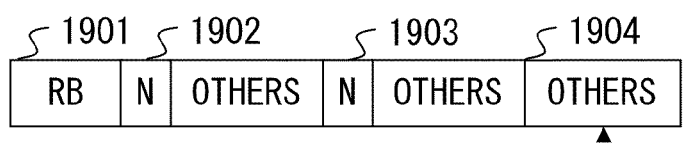
INCLUDING MCS, PID
RB: RB ASSIGNMENT
N: RB NUMBER
MCS: Modulation and coding scheme
PID: PROCESS ID
F I G. 1 9

COMMUNICATION METHOD, COMMUNICATION SYSTEM, COMMUNICATION TERMINAL APPARATUS AND COMMUNICATION BASE STATION APPARATUS

CROSS-REFERENCE TO RELATED APPLICATIONS

This application is a continuation of PCT application PCT/JP2009/001507, which was filed on Mar. 31, 2009, now pending, the contents of which are herein wholly incorporated by reference.

FIELD

The present invention relates to a wireless communication technique to perform data transmission wirelessly. Meanwhile, examples of a wireless communication technique include E-UTRA (Evolved Universal Terrestrial Radio Access) that has been studied as a next-generation mobile-phone communication standard.

BACKGROUND

In new mobile-phone communication standards such as LTE (Long Term Evolution) for which the standardization work has been carried out by the standardization organization 3GPP (3rd Generation Partnership Project), data communication technologies have been developed for enabling high-speed communication at the mobile terminal.

As a retransmitting technique adopted in LTE and the like, a system called Hybrid Automatic Reseat reQuest (HARQ) is known. This system, which has been applied to HSDPA (High Speed Downlink PACKet Access), performs error detection for a communication packet received by the receiver based on an error correcting code attached to the communication packet at the transmitter. Then, the receiver notifies of the transmitter the success/failure of the reception of the communication packet by returning ACK (ACKnowledgement) or Nack (Negative ACKnowledgement) to the transmitter. Therefore, the transmitter can perform retransmission of data by detecting that the data transmission was not performed normally, by reception of Nack.

Specifically, the transmitter transmits data (code block) in which the information bit is encoded, as new transmission data to the receiver. Meanwhile, data to be transmitted is stored at a buffer (HARQ buffer) at the time of new transmission. The transmitter retransmits the transmission data when the receiver returns Nack or when no acknowledgement is received by a reasonable time passes since the packet was transmitted. In this case, the transmitter can also select and transmit a transmission bit from the HARQ buffer according to a fixed rule, upon consideration that the data for which decoding was unsuccessful at the receiver is not discarded and is decoded in combination with the retransmission data. At this time, the same bit as at the time when the new data was transmitted does not need to be transmitted. Meanwhile, the method in which the exactly same bit as at the time of new transmission is transmitted with the retransmission is called Chase combining, and the method in which a different bit is transmitted is called Incremental redundancy.

The receiver side can, even if reception was unsuccessful, perform decoding without discarding the reception data and combining (compounding) it with retransmission data.

There are prior-art documents as stated below as related conventional arts.

[Patent document 1] Japanese Laid-open Patent Publication No. H5-160817
[Patent document 2] Japanese Laid-open Patent Publication No. 2005-109909
[Patent document 3] Japanese Laid-open Patent Publication No. 2006-203355

SUMMARY

As an aspect, a wireless communication method is configured to transmit a new code block and a control signal specifying a modulation system and a coding system applied when transmitting the new code block, and to limit, when performing retransmission of a code block, candidates of combinations of a modulation system and a coding system applied for retransmission, and to transmit the code block and a new code block using the modulation system and a coding system selected from the limited candidates of combinations, and to transmit a control signal including retransmission code block information and not including information specifying the modulation system and the coding system in a retransmission process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration diagram of a transmitter common to each embodiment.

FIG. 4 is a diagram illustrating an example of a wireless communication format adopted in the communication system in each embodiment.

FIG. 5 is a diagram illustrating an example of the format of a resource block adopted in the communication system in each embodiment.

FIG. 6 is a diagram illustrating a transmission format example of a subframe in the first embodiment.

FIG. 7 is an explanatory diagram (part 1) of the first embodiment.

FIG. 8 is an explanatory diagram (part 2) of the first embodiment.

FIG. 11 is a diagram (part 1) illustrating a transmission format example of a subframe in the second embodiment.

FIG. 13 is a diagram illustrating a transmission format example of a control channel corresponding to the second embodiment that can be conceived from the conventional art.

FIG. 14 is a diagram (part 1) illustrating a transmission format example of the control channel in the second embodiment.

FIG. 15 is a diagram (part 2) illustrating a transmission format example of the control channel in the second embodiment.

FIG. 18 is a diagram (part 1) illustrating a transmission format example of the control channel in the third embodiment.

FIG. 19 is a diagram (part 2) illustrating a transmission format example of the control channel in the third embodiment.

DESCRIPTION OF EMBODIMENTS

Figure 2:
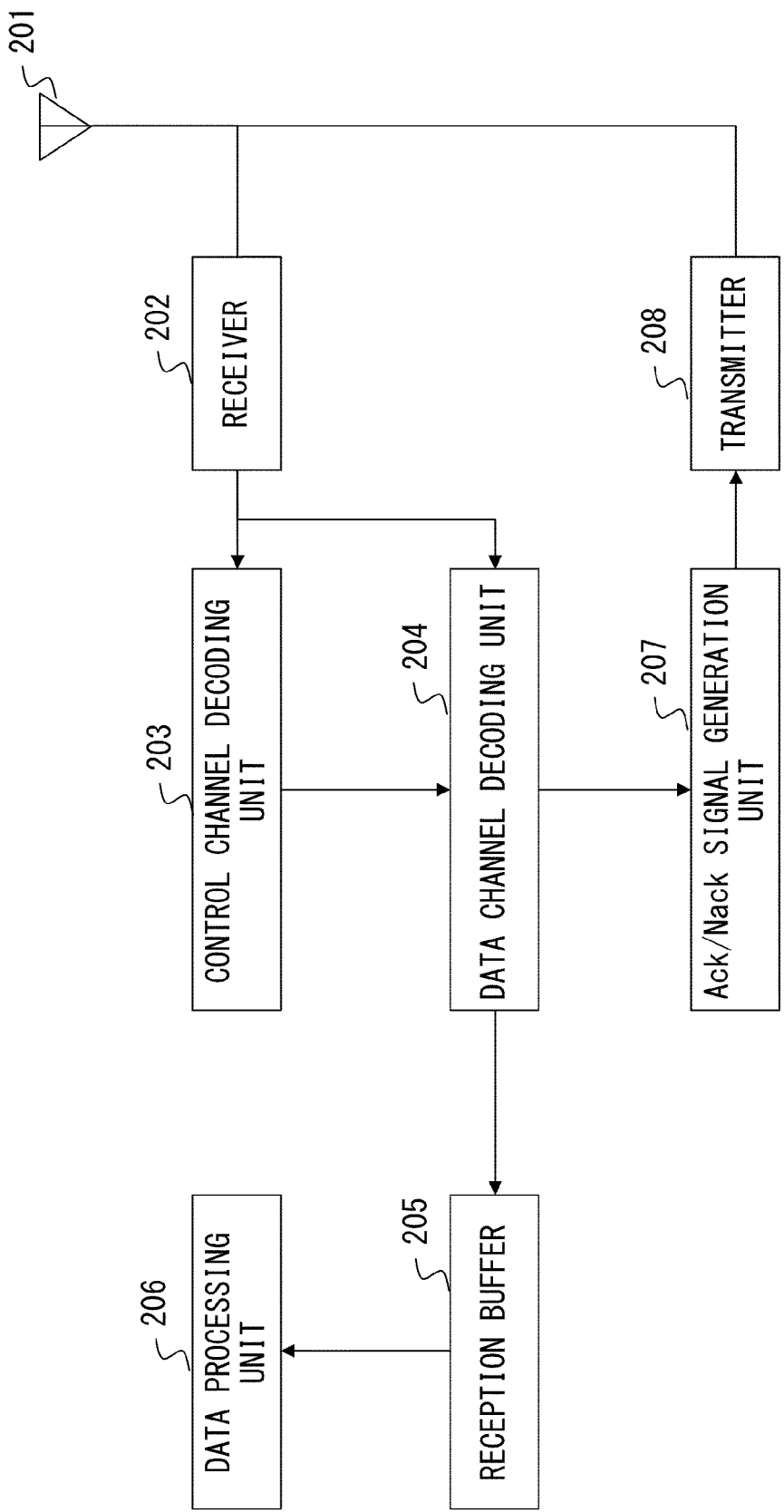
FIG. 2 is a configuration diagram of a receiver common to each embodiment.

Hereinafter, embodiments are described in detail with reference to the drawings.

The embodiments described below relate to a transmitter and a receiver in a wireless communication system such as a mobile phone and the like. The transmitter may be implemented in a transmitter of a mobile phone base station or a transmitter of a mobile phone terminal for example. The receiver may be implemented in a receiver of a mobile phone base station or a receiver of a mobile phone terminal for example.

FIG. 1 is a configuration diagram of a transmitter common to each embodiment described later.

A data processing unit 101 converts voice data and image data into digital data for example, and makes them stored in a transmission buffer 102. Transmission data in the transmission buffer 102 may be retained even after it is transmitted, and may be discarded only after an Ack signal is received from the receiver (may be configured as over-writable). This is because data retained in the transmission buffer may be read out and used for a retransmission process.

A control channel generation unit 104 generates a control signal (control channel signal) to be transmitted via a control channel, and performs each process of coding and modulation for the generated control signal.

A transport block generation unit 105 extracts transmission data from the transmission buffer 102 to be sent at a time as a transport block.

A code block division unit 106 divides a transport block of transmission data in data units called a code block so as to facilitate coding.

A data channel generation unit 107 performs each process of coding and modulation for each code block of transmission data.

To a transmitter 108, a control channel signal generated in the control channel generation unit 104 and a data signal (data channel signal) to be transmitted via a data channel generated in the data channel generation unit 107. The transmitter 108 performs mapping of the control channel signal and the data channel signal in a downlink (communication path extending from a base station to a terminal) or uplink (communication path extending from a terminal to a base station) wireless frame defined in LTE, for example (see FIG. 4 and FIG. 5 described later). Then, the transmitter 108 generates a wireless signal corresponding to each wireless frame and transmits it from an antennal 109.

A receiver 110 receives a control channel returned by the receiver from the antenna 109 (FIG. 2), takes out an Ack signal or a Nack signal from the control channel, and performs notification or it to an Ack/Nack judgment unit 111.

The Ack/Nack judgment unit 111 recognizes, when an Ack signal was sent, that the data transmission was performed normally, and discards transmission data for retransmission in the transmission buffer 102 corresponding to the Ack signal. When a Nack signal was sent, The Ack/Nack judgment unit 111 recognizes that the data transfer was not performed normally, and issues an instruction of a retransmission process to the scheduler unit 103.

The scheduler unit 103 determines the assignment of the resource block, the transport block size, the coding rate and the like described later according to the distinction of new transmission/retransmission, and issues an instruction of generation of a control signal that is in line with the determined details to the control channel generation unit 104. In addition, it issues an instruction of a retransmission process of a code block corresponding to the transmission buffer 102. In addition, it also issues an instruction to the data channel generation unit 107 for generating transmission data that is in line with the determined transport block size, coding rate and the like.

However, in this embodiment, when transmission of a plurality of code blocks is performed and an error occurs in a part of the code blocks, it is made possible to perform retransmission for a part of code blocks in the retransmission process. At the time of retransmission, a plurality of retransmission data blocks may be transmitted, or new data (a new data block) and retransmission data (a retransmission data block) may be mixed and transmitted.

Accordingly, since transmission of a plurality of code blocks can be performed, the transmission efficiency increases, and since there is no need in the retransmission process to retransmit all the code blocks related to new transmission, unnecessary data transmission can be prevented. Furthermore, by mixing and transmitting a new code block at the time of retransmission, the transmission efficiency at the time of a retransmission process can be increased.

Meanwhile, it is assumed that, at that time, information with which a data block being a retransmission data block can be identified (retransmission code block information) is sent to the receiver. For example, it is assumed that three code blocks were sent in new transmission, and reception at the receiver was unsuccessful only for the first code block (c). Then, three block are transmitted again in retransmission and if the first code block is retransmitted (retransmission of the code block (c)) and the second and third code blocks are new code blocks, by setting "100" as control information regarding the retransmission, the first bit "1" can notify that the first code block is retransmitted, and the remaining "0", "0" can notify that the second and third code blocks are newly transmitted. The identification information may be generated by the control channel generation unit 104 based on the determination by the scheduler and may be transmitted via the transmitter 108, for example. In addition, at the time of transmission, transmission of the control channel and data channel is performed by the control channel generation unit 104 and the data channel generation unit 107.

Functions of the processing unit 101, the scheduler unit 103, the control channel generation unit 104, the transport block generation unit 105, the code block division unit 106, the data channel generation unit 107, and the Ack/Nack judgment unit 111 may be realized by one or combination of processors, e.g., Central Processing Unit (CPU), Digital signal Processor (DSP), Field Programmable Gate Allay (FPGA).

FIG. 2 is a configuration diagram of receiver common to each embodiment described later.

A control channel decoding unit 203 performs demodulation and decoding for the control channel that a receiver 202 receives from an antennal 201. Meanwhile, if the modulation method and the coding method used for the transmission of the control channel are fixed at a predetermined modulation method and coding method, decoding can be easily performed using a predetermined demodulation and decoding method corresponding to the predetermined decoding and coding method. In the case where a plurality of modulation method and coding method can be adopted, a plurality of types of reception process may be performed according to their combination, to determine a method with which no error is detected as the correct method, and a control signal may be obtained by the correct method.

A data channel decoding unit 204 determines the demodulation method and the decoding method based on the decoding result of the control channel at the control channel decoding unit 203, and demodulates and decodes the data channel according to the determined demodulation method and decoding method.

If the demodulation and decoding of the data channel was successful and new data has been obtained, the data channel decoding unit 204 gives the obtained data channel to a data processing unit 206 via a reception buffer 205.

When the demodulation and decoding of the data channel was unsuccessful, the data channel decoding unit 204 stores the data in the reception buffer 205.

When the demodulation and decoding of the data channel was unsuccessful and retransmission data has been obtained, the data channel decoding unit 204 performs compounds the data stored in the reception buffer 205 and the retransmission data and performs demodulation and decoding of the data, and gives the obtained data to the data processing unit 206 via the reception buffer 205. If the data channel decoding unit 204 succeeded in the demodulation and decoding of the data channel, Ack/Nack signal generation unit 207 generates a control channel in which an Ack signal corresponding to the successful data channel. If the data channel decoding unit 204 failed in demodulation and decoding of the data channel, the Ack/Nack signal generation unit 207 generates a control channel in which a Nack signal corresponding to the failed data channel is set. The Ack/Nack signal generation unit 207 transmits the control channel generated as described above to the transmitter (FIG. 1) from the antenna 201 via a transmitter 208.

The data processing unit 206 reproduces voice data, image data and other communication and the like from the data channel received via the reception buffer 205.

Functions of the control channel decoding unit 203, the data channel decoding unit 204, data processing unit 206, and Ack/Nack signal generation unit 207 may be realized by one or combination of processors, e.g., CPU, DSP and FPGA.

Figure 3:
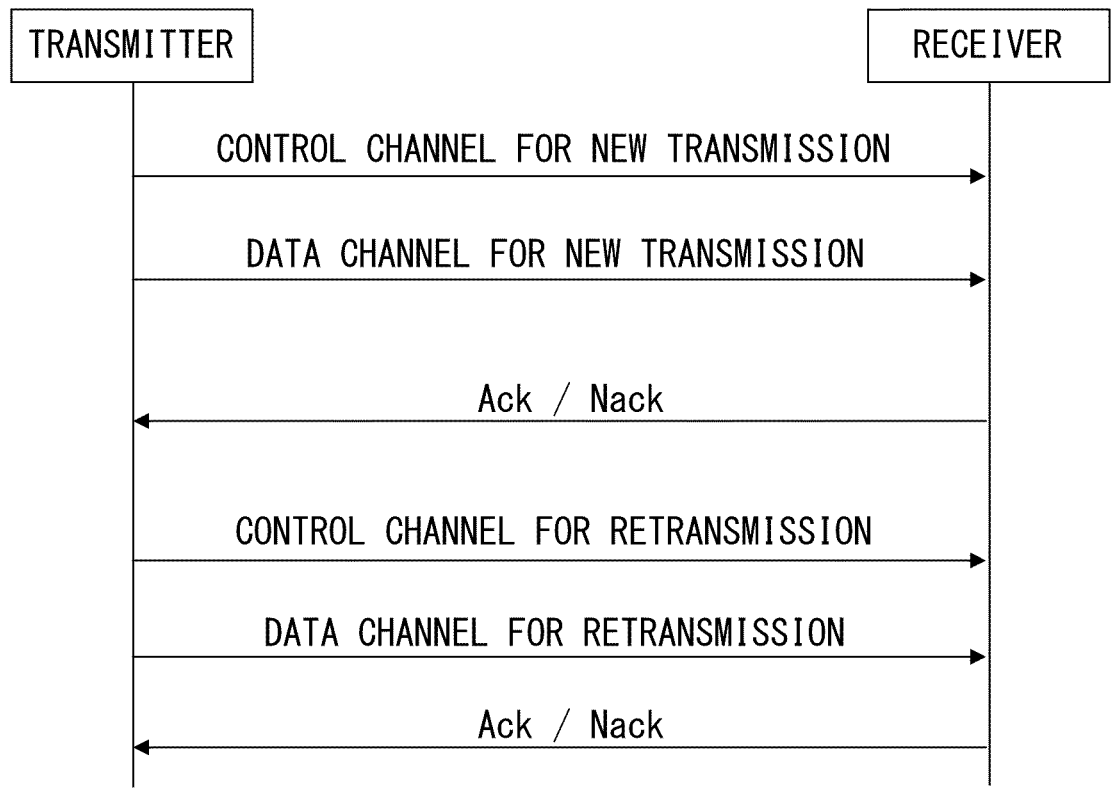
FIG. 3 is a sequence diagram illustrating the communication operation between the transmitter and the receiver.

FIG. 3 is a sequence diagram illustrating the communication operation between the transmitter in FIG. 1 and the receiver in FIG. 2. The transmitter in FIG. 1 transmits the control channel and the data channel at the time of new transmission. Information for demodulating and decoding the data channel is included in the control channel. The receiver in FIG. 2 is to demodulate and decode the data channel according to the contents of the control channel. Then, when data reproduction was done correctly, an Ack signal is fed back to the transmitter and when data reproduction was not done correctly, an Nack signal fed back to the transmitter, and the transmitter sends retransmission data to the block for which a Nack signal was received. At that time, new data is also transmitted in addition to the retransmission data, performing data transmission with new and retransmission being mixed.

FIG. 4 and FIG. 5 is a diagram illustrating an example of the communication format adopted in the communication system of each embodiment, in which OFDM (Orthogonal Frequency Division Multiplexing) communication system is adopted, and communication is performed using the subcarrier divided into a plurality of bands on the frequency band.

FIG. 4 is a diagram illustrating a data format example of a communication frame. The communication is performed in units of frames, subframes, slots and symbols. One wireless frame as a temporal length of 10 msec (milliseconds) for example, and includes 10 subframes. One subframe has a temporal length of 1 msec for example, and includes two slots for example. One slot has a temporal length of 0.5 misec for example, and includes 7 symbols for example. Each symbol is a complex modulation symbol transmitted from the transmitter 108 in FIG. 1.

Each slot is mapped in a resource grid formed by symbol columns in the time direction and the subcarrier group in the frequency direction, as illustrated in FIG. 5. Each element 502 in the resource grid is called a resource element, and one symbol is assigned to each resource element 502.

A resource grid area 501 formed by one slot and consecutive 12 subcarriers is called a resource block, which becomes the unit to transmit communication data. Furthermore, how many blocks and what position in the frequency band of the resource block 501 are to be used between the transmitter and the receiver is determined for each subframe (=1 msec) formed by 2 consecutive slots, and communication is performed using the determined one or more resource blocks 501. Which position of the resource block 501 in the frequency band to be used is determined based on the reception quality at the terminal for example. Specifically, information of the reception quality of the pilot system (mapped in the resource block 501 and transmitted) is transmitted from the terminal to the base station using the control channel as CQI (Channel Quality Indicator). The base station selects the resource block 501 at a frequency position with good reception quality based on the CQI. Meanwhile, how many blocks of the resource block 501 to be used is determined by the base station based on the band usage request from the terminal. The assignment information of the resource block 501 determined as described above is set in the downlink control channel and sent to the terminal for each subframe (=1 msec). The terminal performs communication for each subframe using the resource block 501 corresponding to the resource block assignment sent from the base station. The example in FIG. 5 illustrates that communication is performed in a subframe 1 using 3 resource blocks of #x, #y, #z.

To one resource block 501, 7 symbols×12 subcarriers=84 symbols are assigned. Therefore, assuming that n resource blocks 501 are used in a given subframe, the communication volume of the subframe is 84×n symbols.

For the uplink communication format, not OFDM but SC-FDMA (Single Carrier Frequency Division Multiple Access) communication system may also be used. However, the basic ideas for the wireless frame, subframe, slot, symbol and resource block are the same.

The first embodiment based on the implementation examples of the transmitter and the receptor and the example of the communication format is explained below.

FIG. 6 is a diagram illustrating a transmission format example of a subframe in the first embodiment. Each subframe transmits a plurality of code blocks using one or more resource blocks 501 described above in FIG. 5. The code block is a group of data in which a transport block (group of data to be transmitted at a time) is divided so as to facilitate coding, and is generated by the code block division unit 106 in FIG. 1. Here, for example, a code block is generated with a transport block being divided equally so that one block is smaller than a predetermined size. In addition, information for error detection (CRC for example) is attached to each code block, and the data channel decoding unit 204 in FIG. 2 is configured to be able to detect, for each code block, whether or not it was decoded successfully (whether it contains an error).

In FIG. 6, a case in which in a subframe 0 in FIG. 6(*a*), 3 code blocks to which numbers "1", "2", "3" are assigned are transmitted in a mixed manner, and a Nack signals were returned for the "2" and "3" code blocks among them. In this case, the transmitter retransmits the "2" and "3" code blocks after a timing (subframe 8 for example) at which the time required for the retransmission process has passed since the code blocks were transmitted. If a Nack signal was returned again for the "2" code block in response, the "2" code block is retransmitted again in the subframe 16 for example that is 8 subframes later, and an Ack signal is returned. In the subframe 24 for example that is 8 subframes later, "4", "5", "6" code blocks being new data are transmitted.

As described above, in this embodiment, a retransmission request is performed for blocks for which an error was detected among a plurality of code blocks transmitted in a mixed manner in a subframe, and no retransmission request is performed for a block for which no error was detected. Then, when retransmission is performed, from the transmitter, which code blocks have been transmitted is told by identification information of the retransmission block transmitted via the control channel, the receiver identifies the code blocks that it should receive, using the identification information.

However, when the identification information (retransmission block information) is added to the control channel, as illustrated in FIG. 7, the control channel format at the time of retransmission illustrated in FIG. 7(*b*) becomes bigger than that at the time of transmission new data illustrated in FIG. 7(*a*). Meanwhile, in FIG. 7, "RB assignment" is information indicating which position of the resource block 501 in the frequency band is to be used for data transmission in the current subframe, as described in FIG. 5.

Then, in this example, as illustrated in FIG. 8, the control channel generation unit 104 in FIG. 1 performs control so as not to send the MCS (Modulation and Coding Scheme) information that was sent at the time of transmission of new data in FIG. 8(*a*) at the time of retransmission in FIG. 8(*b*). Accordingly, increase in the total data volume of the control signal at the time of retransmission is suppressed. Preferably, the same format is maintained for the time of new transmission and the time of retransmission. That is, the total data volume is maintained as the same. If the entire data area cannot be filled with meaningful data, the total data volume may be made equal by inserting padding data.

The advantage that is obtained when even the format is matched is descried briefly below. Meanwhile, the match of the format is not necessary.

When there are two types of formats, the control channel decoding unit 203 of the receiver (FIG. 2) cannot tell in which format the transmission is to be performed, so it performs the decoding process twice according to both formats, to determine the correctly received one as the transmitted format. Therefore, when two types of formats are used, the processing volume at the terminal becomes twice compared with the case with one type of format. In addition, since the error detection rate increases in proportion to the number of decoding, the error detection rate also becomes twice compared with the case with one type of format.

Here, as illustrated in FIG. 8, one type of format is assumed.

Meanwhile, in the example in FIG. 8, it is assumed that the MCS information is not to be transmitted by the control channel at the time of retransmission, in this case, the receiver is to try the reception process for all possible combinations of MCS and to receive the MCS for which no error was detected, as the one that the transmitter applied.

Therefore, in this example, the coding rate corresponding to each modulation system is determined in advance, to suppress the load of the reception processing at the time of retransmission.

Here, the MCS information is information indicating the modulation system and the coding rate. The modulation system includes, for example, QPSK (Quadrature Phase Shift Keying), 16QAM (Quadrature Amplitude Modulation), 64QAM and the like. In QPSK, 2 bits per symbol, in 16QAM, 4 bits per symbol, in 64QAM, 6 bits per symbol can be transmitted. Each symbol is stored and transmitted in a resource element 502 in the resource block 501 in FIG. 5 mentioned above. The coding rate is the ratio of the number of bits before error correcting coding to the number of bits after error correcting coding. The error correcting is a process to improve characteristics by transmitting data in a redundant manner, so the number of bits after the error correcting coding becomes larger than the number of bits before the error correcting coding. Therefore, the coding rate becomes equal to or smaller than 1.

In this example, for example, it is determined that the coding rate is smaller than a threshold value Q1 with QPSK, the coding arte is smaller than a threshold value Q2 (Q1<Q2) with 16QAM. The transmitter selects the modulation system and the coding rate within the range (MCS selection population including only the number of MCS candidates that is smaller than the number of MCS candidates selected at the time of new transmission or MCS selection population including only a part of MCS candidates of MCS candidates selected at the time of new transmission), so as to reduce the load to try the reception process at the receiver at the time of retransmission.

Figure 9:
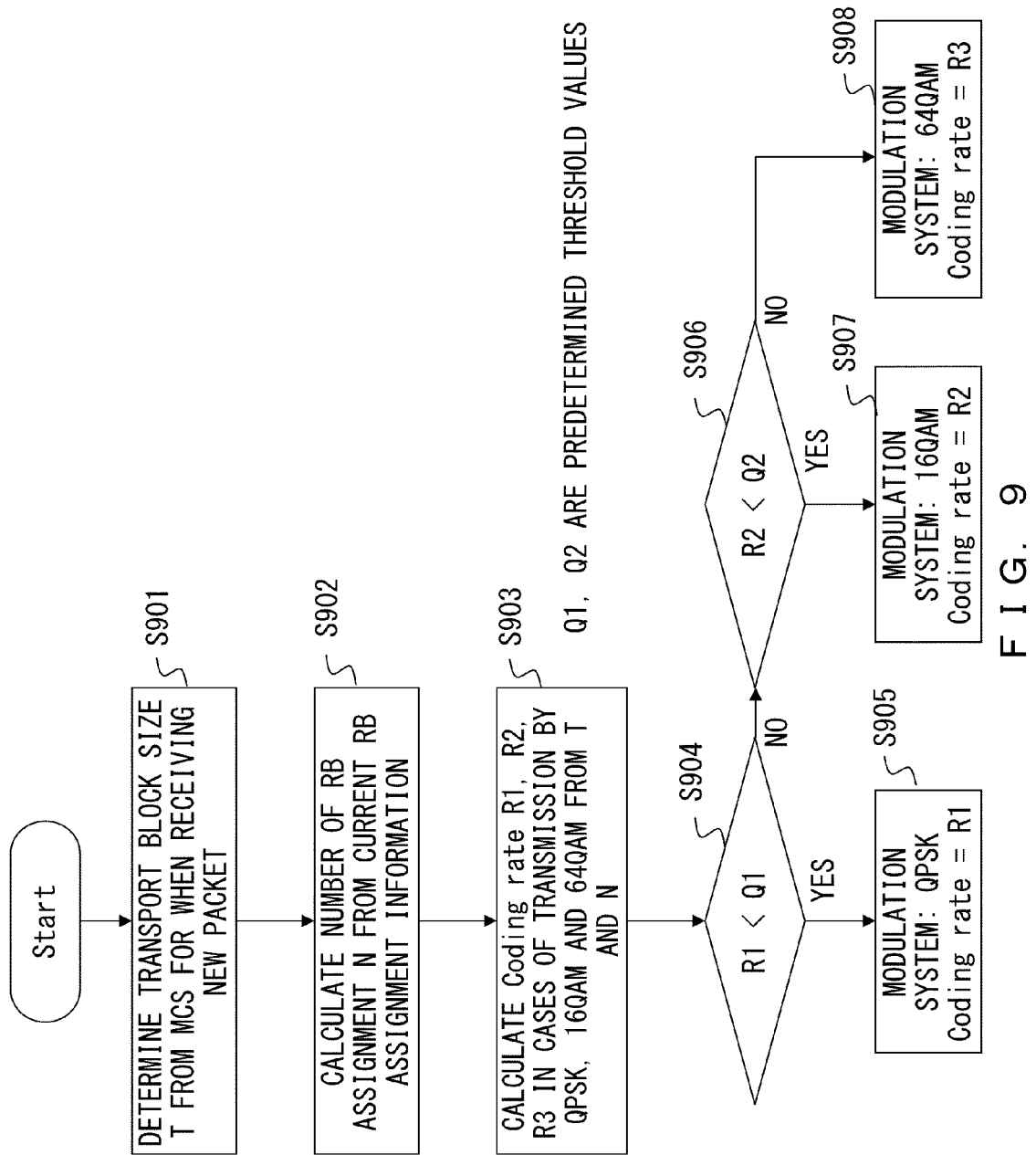
FIG. 9 is an operation flowchart illustrating the operation of a control channel decoding unit of the receiver at the time of retransmission.

FIG. 9 is an operation flowchart illustrating the operation of the control channel decoding unit 203 in of the receiver (FIG. 2) at the time of retransmission in this case.

The control channel decoding unit 203 first determines the transport block size T from the MCS information in the control channel that was sent at the time of new transmission (step S901 in FIG. 9).

Next, the control channel decoding unit 203 calculates the number of resource blocks (RB number) N used in the current subframe, from the resource block assignment information ("RB assignment" in FIG. 8) sent by the control channel in the current (retransmission) subframe (step S902 in FIG. 9).

The control channel decoding unit 203 calculates the coding rates R1, R2, R3 in the cases in which transmission is performed in each modulation systems of QPSK, 16QAM and 64QAM, from the transport block size T and the number of resource blocks N described above (step S903 in FIG. 9).

Then, the control channel decoding unit 203 judges whether or not the coding rate R1 is smaller than the threshold value Q1 (step S904 in FIG. 9).

If the control channel decoding unit 203 determines that the coding rate R1 is smaller than the threshold value Q1, it determines the modulation system as QPSK and the coding rate as R1 (step S905 in FIG. 9).

If the control channel decoding unit 203 determines that the coding rate R1 is equal to or above the threshold value Q1, it further judges whether or not the coding rate R2 is smaller than the threshold value Q2 (step S906 in FIG. 9).

If the control channel decoding unit 203 determines that the coding rate R2 is smaller than the threshold value Q2, it determines the modulation system as 16QAM and the coding rate as R2 (step S907 in FIG. 9).

If the control channel decoding unit 203 determines that the coding rate R2 is equal to or above the threshold value Q2, it determines the modulation system as 64QAM and the coding rate as R3 (step S908 in FIG. 9).

The control channel decoding unit 203 performs notification of the modulation system and the coding rate determined as described above to the data channel decoding unit 204 (FIG. 2), and makes it perform the decoding process.

Meanwhile, it is assumed that the combination of each modulation system and coding rate is determined in advance at the transmitting side and the receiving side, so that any mutual inconsistency does not occur for the decision logic of the coding rate corresponding to each modulation system described.

Figure 10:
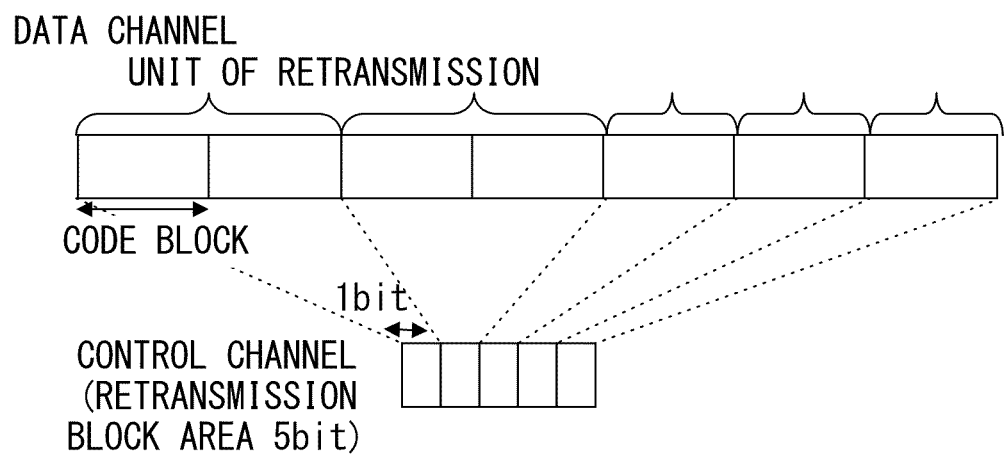
FIG. 10 is a diagram illustrating the mapping of retransmission block information set in the control channel at the time of retransmission and a code block that is actually retransmitted.

FIG. 10 is a diagram illustrating the mapping of retransmission block information set in the control channel in FIG. 8(*b*) at the time of retransmission and the code block that is actually retransmitted. The number of bits of the MCS information in the control channel is determined in advance depending on the system, and explanation is made here assuming it as 5 bits for example. As a further example, explanation is made with an example of the case in which the maximum number of code blocks that are sent at the same time in the subframe is 7. As illustrated in FIG. 10, the first 4 blocks are to be sent as retransmission in units 2 code blocks and the last 3 code blocks are to be sent as new transmission code block by code block, and the distinction between the retransmission or new transmission is specified for each by each bit of area of the retransmission block of the control channel (see FIG. 8(*b*)). In this manner, with the retransmission block controlled so as to be the same number of bits as the number of bits of the MCS information, the same format of the control channel can be used at the time of new transmission and at the time of retransmission. Of course, the number of bits does not necessarily be matched.

Next, the second embodiment based on the implementation example of the transmitter and the receiver illustrated in FIG. 1 and FIG. 2 and the example of the communication format illustrated in FIG. 3-FIG. 5 is explained below.

First, a case in which a new block is added before an Ack signal is returned for all blocks sent first is considered.

FIG. 11 is a diagram illustrating a transmission format example of a subframe in the second embodiment. It is preferable to make the data size specification changeable so that a new data size can be assigned when a code block of a new transport block is added, especially for wireless communication in which the propagation environment easily changes. In addition, it is more preferable if the specification of the modulation system and resource assignment can be done. That is, it is desirable to the additional portion by another HARQ process.

In the transmission format example in FIG. 11, for code blocks "1-1", "1-2", "1-3" corresponding to the transport block 1 newly transmitted in the subframe 0 in FIG. 11(*a*), "1-2" and "1-3" are transmitted in the subframe 8 in FIG. 11(*b*). At this time simultaneously, a code block "2-1" corresponding to a new transport block 2 is newly transmitted. In addition, in the subframe 16 in FIG. 11(*c*), the code block "1-2" of the transport block 1 and the code block "2-1" of the transport block 2 are retransmitted, and a code block "5" of the transport block 2 is newly transmitted. Then, in the subframe 24 in FIG. 11(*d*), a code block "2-3" of the transport block 2 and code blocks "3-1" "3-2" of the transport block 3 are all newly transmitted.

Figure 12:
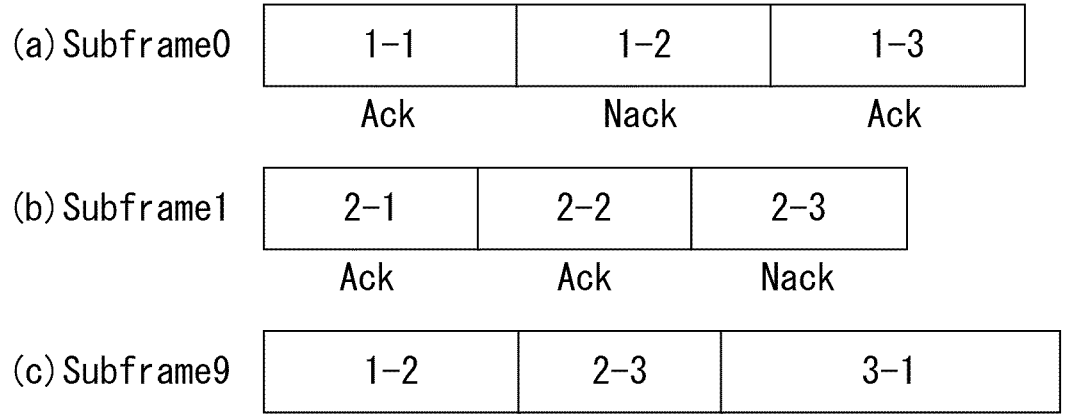
FIG. 12 is a diagram (part 2) illustrating a transmission format example of a subframe in the second embodiment.

In the transmission format example in FIG. 12, code blocks "1-1", "1-2", "1-3" related to the transport block 1 are newly transmitted in the subframe 0 in FIG. 12(*a*), and in the next subframe 1 in FIG. 12(*b*), new code blocks "2-1", "2-2", "2-3" of another transport block are transmitted. Then, in the subframe 9 in FIG. 12(*c*), retransmission data "1-2", "2-3" for the different transport blocks transmitted in each of FIGS. 12(*a*) and (*b*), and further a new code block "3-1" of the third transport block are retransmitted in a mixed manner.

With the HARQ process being assigned individually as described above, it becomes possible even to retransmit code blocks of different transport blocks at a time.

When such a control system is adopted, it becomes possible to understand the code block of which transport block is retransmitted by the process ID of HARQ specified in the control channel. In addition, about which code block in the same process (same transport block) is retransmitted, retransmission block information may be specified in the control channel by the same method as in the first embodiment.

However, since control information about a plurality of HARQ processes needs to be presented, as illustrated in FIG. 13 the control information becomes long. In this case, the size of the control channel differs depending on how many HARQ processes are to be transmitted at the same time.

Therefore, in the second embodiment, the control channel generation unit 104 in FIG. 1 and the control channel decoding unit 203 in FIG. 2 adopts transmission format using a plurality of control channels in a plurality of resource blocks (see FIG. 5), as illustrated in FIG. 14. Accordingly, the (maximum) data size of one control channel becomes constant. Here, the retransmission block information at the time of retransmission is set in the data portion indicated by each MCS in each control channel illustrated in FIG. 14 instead of the MCS and transmitted.

The transmission format is effective in the case in which, as illustrated in FIG. 15, a plurality of physical resources (resource blocks) that should receive the control channel have been selected in advance in the subframe. In FIG. 15, it has been determined in advance that for 4 physical resources, the control channel may be assigned to one or two physical resources. Therefore, the control channel decoding unit 203 of the receiver (FIG. 2) is to perform blind decoding for physical resources of 6 patterns in the example in FIG. 15. Such conditions are adopted due to the system constraint that it is desirable to maintain possibility for assignment for a broad range to some extent, since the assignment is made for the user at that time from common resource blocks. In this case, as described in FIG. 5, the receiver is originally designed to receive a plurality of resource blocks for each subframe, even if a plurality of control channels are mapped for retransmission, it is possible to detect retransmission block information without increasing the load of decoding.

Figure 16:
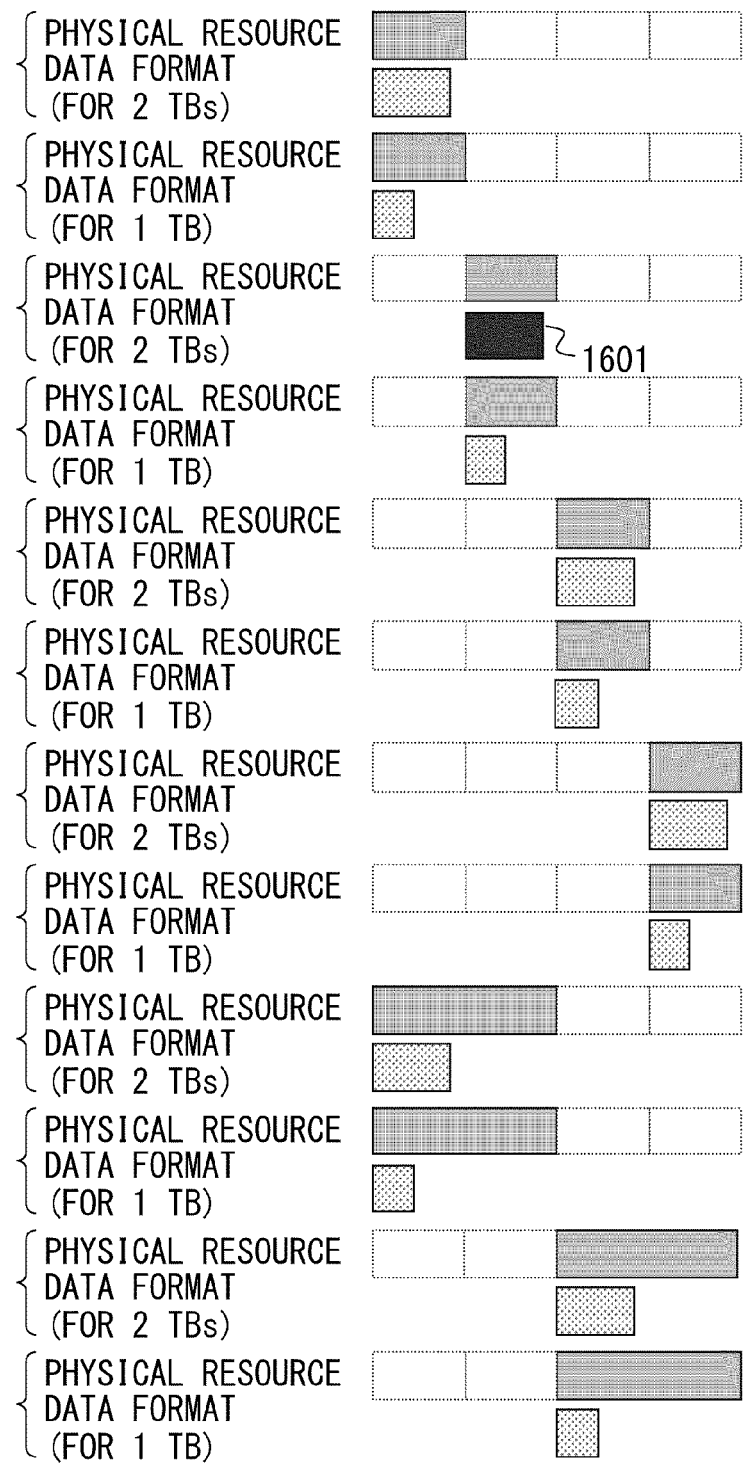
FIG. 16 is an explanatory diagram (part 1) of a blind decode operation of the control channel in the second embodiment.

FIG. 16 is a diagram illustrating an example of patterns of blind decoding in a receiver in which there are two types of transmission format for the control channel (decoding to perform reception while detecting the transmission format applied actually by trying the reception process for each possible transmission format). In this example, since the transmission format of the control channel has two types of length, two patterns of blind decoding needs to be performed for each of the six types of detection timing in the cases with one resource block and 2 resource blocks. For this reason, blind decoding needs to be performed 12 times in total. In FIG. 16, for example, if the third pattern of decoding from the top indicated as 1601 is successful, the receiver determines that data corresponding to 2 transport blocks are transmitted. The data channel is received based on the control channel decoded as described above. The number of patterns of blind decoding becomes large in this example.

Figure 17:
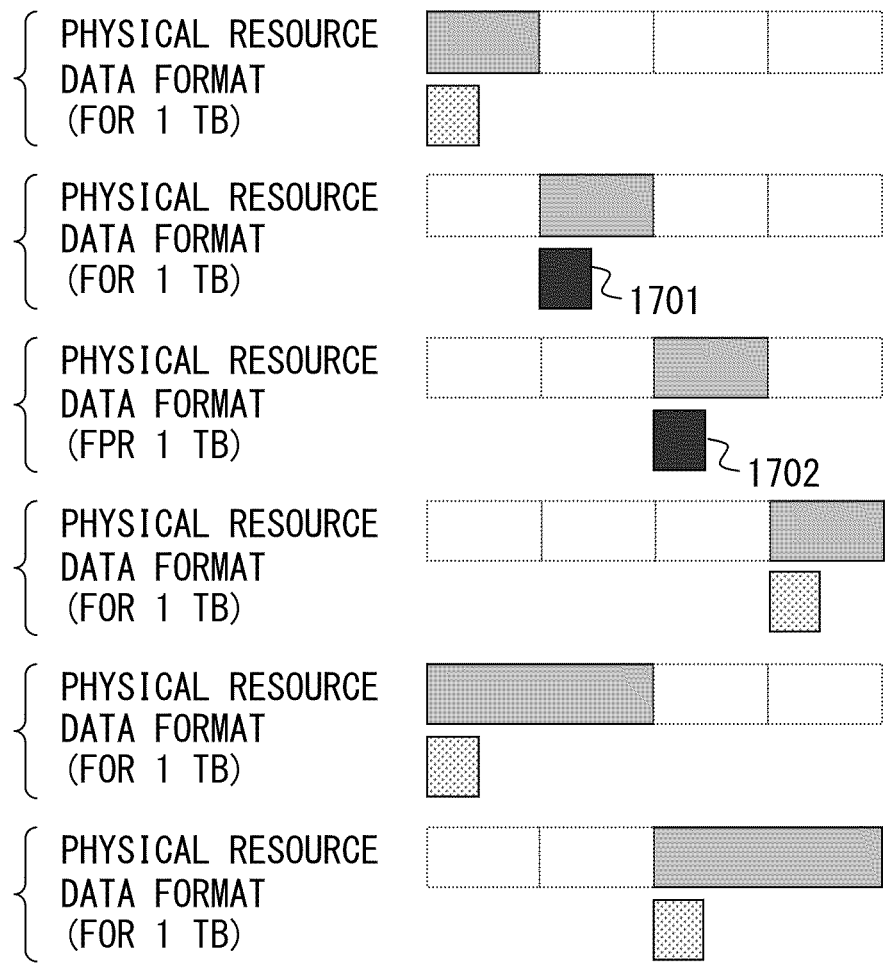
FIG. 17 is an explanatory diagram (part 2) of a blind decode operation of the control channel in the second embodiment.

By contrast, in the second embodiment, the control channel decoding unit 203 in FIG. 2 performs the blind decoding pattern as illustrated in FIG. 17. In this example, since there is only one type of transmission format of the control channel, only one pattern of blind decoding for each of the six types of detection timing for the cases with one resource block and 2 resource blocks needs to be performed. Accordingly, blind decoding needs to be performed 6 times in total only. In this case, according to the number of transport blocks transmitted in a mixed manner, if data exists in a subframe, control information is set in one or 2 control channels. For example, if decoding of the second pattern and the fourth pattern indicated as 1701 and 1702 are successful, the control channel decoding unit 203 determines that data corresponding to 2 transport blocks is transmitted. The data channel decoding unit 204 (FIG. 2) can receive the data channel, based on the control channel decoded as described above.

Thus, in the second embodiment, with the plurality of number of control channels, the number of bits per control channel can be constant regardless of new or retransmission. Accordingly, it can be constant regardless of the number of HARQ processes. Accordingly, it becomes possible to reduce the number of blind decoding at the receiver.

Next, the third embodiment based on the implementation example of the transmitter and the receiver illustrated in FIG. 1 and FIG. 2 and the example of the communication format illustrated in FIG. 3-FIG. 5 is explained below.

In the third embodiment, in the same manner is the second embodiment, a case in which a plurality of HARQ processes are transmitted at the same time is considered.

FIG. 18 is a diagram illustrating the example of the transmission format of the control channel in the third embodiment. In the third embodiment, the maximum number of the HARQ process is determined as 2 for example, and when the number of the HARQ process is 1, the number of bits of the control channel is aligned by adding padding as illustrated in FIG. 18(*a*). At the time of retransmission, the field of MCS is replaced with retransmission block information. It is desired that the number of bits of the overall control channel to reduce the number of padding bits. Therefore, when a plurality of HARQ processes are transmitted, the assignment of the resource block is performed not for each HARQ process but for the entire HARQ processes (1801 in FIG. 18). Then, for each HARQ process, only the number of resource blocks (RB number) is presented in the control channel (1802 in FIG. 18). Accordingly, the number of bits of the control channel can be reduced. Although the degree of freedom of the resource block assignment becomes low, since the same number of resources may be assigned to each HARQ process, approximately the same communication characteristics can be obtained for each process.

FIG. 19 is a diagram illustrating an example of the transmission format of the control channel in a case in which the maximum number of the HARQ process is set as 3. In this case, only one number of resource blocks is specified (1901 in FIG. 19), and only the number of resource blocks (RB number) is presented to each HARQ process (1902, 1903 in FIG. 19). Meanwhile, the number of resource blocks of the last transport block can be understood by subtracting the number of resource blocks specified to transport blocks specified for the transport blocks excluding itself from the number of resource blocks that can be counted in the resource block assignment part (1901 in FIG. 19), there is no need to specify it by the control channel (1904 in FIG. 19). In FIG. 19, the field presented as "OTHERS" include MCS information and information of the process ID (PID). Then, at the time of retransmission, the MCS information is replaced with retransmission block information as needed.

The operation of the third embodiment described above is realized with the control channel generation unit 104 of the transmitter (FIG. 1) and the control channel decoding unit 203 (FIG. 2) of the receiver operating in coordination.

As described above, according to the first, second and third embodiment, since in the control channel, it becomes possible to transmit and receive retransmission block information without sending MCS information, the bits of the control channel may be reduced, leading to improvement in the frequency usage efficiency.

In addition, according to the first, second and third embodiment, by not sending MCS information at the time of retransmission, even in a case in which identification information of the code block is to be transmitted, the number of bits of the control channel can be adjusted, to align the number of bits of the control channel for the time of new transmission and for the time of retransmission. Accordingly, in a system in which blind decoding is performed the control channel, the number of blind decoding is reduced, and it becomes possible to reduce power consumption at the receiver, and to lower the error detection rate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method comprising:
    transmitting a first code block and a first control signal which specifies a modulation and a coding scheme applied to transmission of the first code block from among a first number of candidates for a modulation and coding scheme to be applied to new transmission; and
    retransmitting the first code block together with a second code block using a modulation and a coding scheme selected from a second number of candidates for a modulation and coding scheme to be applied to retransmission where the second number is less than the first number, while transmitting a second control signal that includes retransmission code block information but does not include scheme information for specifying the selected modulation and coding scheme.

2. The wireless communication method according to claim 1, wherein
    a data size of a the first control signal and a data size of a the second control signal are equal to each other, and
    the first control signal and the second control signal are transmitted in a same format.

3. The wireless communication method according to claim 1, wherein
    the first control signal includes size information of a transport block;
    the retransmission code block information includes assignment information that indicates a number of resource blocks assigned for retransmitting the first code block together with the second code block; and a modulation scheme and a coding rate used in retransmitting the first code block together with the second code block are estimated from the size information and the assignment information, and a process of receiving the first code block and the second code block is controlled using the estimated modulation scheme and the estimated coding rate.

4. The wireless communication method according to claim 3, wherein the retransmission block information includes a bit map that specifies which of a plurality of code blocks that are transmitted together is a retransmitted a code.

5. The wireless communication method according to claim 4, wherein a certain bit of the bit map collectively displays whether certain code blocks corresponding to the certain bit are retransmitted code blocks or whether the certain code blocks are first transmitted code blocks; and a number of bits of the bit map is equal to a number of bits in the first control signal that are used for specifying the modulation and coding scheme.

6. The wireless communication method according to claim 1, wherein the first code block is retransmitted together with the second code block in a single subframe that is a unit of communication control;

when the first and second code blocks are of different transport blocks and the second code block has been transmitted at least once before the second code block is transmitted together with the retransmitted first code block, the second control signal and a third control signal that includes another piece of retransmission code block information for indicating retransmission of the second code block but does not include the scheme information are transmitted in different control channels; and each of the second and third control signals is received and decoded by a blind decoding.

7. The wireless communication method according to claim 1, wherein the first code block is retransmitted together with the second code block in a single subframe that is a unit of communication control;

when the first and second code blocks are of different transport blocks, the second control signal is transmitted in a control channel together with:

resource block information that indicates resource blocks assigned for retransmitting the first code block together with the second code block and that is common to the different transport blocks; and pieces of number information, each indicating a number of resource blocks assigned to each of the different transport blocks; and when the first and second code blocks are of a same transport block, the second control signal is transmitted in the control channel together with:

the resource block information;

another piece of number information that indicates a number of resource blocks assigned to the same transport block; and padding bits to keep a number of bits transmitted in the control channel constant regardless of a number of transport blocks; and communication for each transport block is controlled based on the resource block information and each piece of number information.

8. A communication system that retransmits at least one of but not all of a plurality of pieces of data that have been transmitted at a same time, the communication system comprising:

a transmitter configured to transmit retransmission control information in a control channel when retransmitting a certain piece of data, the retransmission control information being information transmitted in place of predetermined control information for specifying a modulation and coding scheme in new transmission; and a receiver configured to receive the retransmission control information in the control channel when the certain piece of data is retransmitted, to estimate a modulation and coding scheme applied to retransmission of the certain piece of data, from information having been received in the control channel in new transmission of the certain piece of data, and to control a process of receiving the retransmitted certain piece of data, using the estimated modulation and coding scheme and the retransmission control information.

9. A communication terminal apparatus comprising:

a memory; and a processor configured to:

transmit a first code block and a first control signal which specifies a modulation and a coding scheme applied to transmission of the first code block from among a first number of candidates for a modulation and coding scheme to be applied to new transmission; and retransmit the first code block together with a second code block using a modulation and a coding scheme selected from a second number of candidates for a modulation and coding scheme to be applied to retransmission where the second number is less than the first number, while transmitting a second control signal that includes retransmission code block information but does not include scheme information for specifying the selected modulation and coding scheme.

10. A communication base station apparatus comprising:

a memory; and a processor configured to obtain, when data is retransmitted, retransmission control information that is transmitted and received in a control channel in place of predetermined control information for specifying a modulation and coding scheme in first transmission of the data, to estimate a modulation and coding scheme applied to retransmission of the data, from information having been received in the control channel in the first transmission of the data, and to control a process of receiving the retransmitted data, using the estimated modulation and coding scheme and the retransmission control information.

* * * * *

UNITED STATES PATENT AND TRADEMARK OFFICE
CERTIFICATE OF CORRECTION

PATENT NO. : 9,009,555 B2
APPLICATION NO. : 13/235558
DATED : April 14, 2015
INVENTOR(S) : Akira Ito It is certified that error appears in the above-identified patent and that said Letters Patent is hereby corrected as shown below:

Title Page, Item (54) and in the Specification at Column 1, lines 1-5, Title:

delete

"COMMUNICATION METHOD,
COMMUNICATION SYSTEM,
COMMUNICATION TERMINAL APPARATUS
AND COMMUNICATION BASE STATION
APPARATUS"

and insert

-- COMMUNICATION METHOD, SYSTEM, TERMINAL APPARATUS, AND BASE STATION APPARATUS FOR ESTIMATING A PREVIOUSLY SELECTED MODULATION AND CODING SCHEME FOR RETRANSMISSION --.

Signed and Sealed this
Twelfth Day of May, 2015

Michelle K. Lee
*Director of the United States Patent and Trademark Office*